Jan. 24, 1961 W. T. SELSTED 2,969,200

MAGNETIC TAPE APPARATUS

Filed July 18, 1955 4 Sheets-Sheet 1

INVENTOR.
Walter T. Selsted

BY Flehr and Swain

ATTORNEYS

MAGNETIC TAPE APPARATUS

Filed July 18, 1955 4 Sheets-Sheet 2

INVENTOR.
Walter T. Selsted
BY Flehr and Swain
ATTORNEYS

INVENTOR.
Walter T. Selsted
BY Flehr & Swain
ATTORNEYS

INVENTOR.
Walter T. Selsted
BY
Flehr & Swain
ATTORNEYS 2,969,200
Patented Jan. 24, 1961

2,969,200

MAGNETIC TAPE APPARATUS

Walter T. Selsted, Redwood City, Calif., assignor to Ampex Corporation, Redwood City, Calif., a corporation of California Filed July 18, 1955, Ser. No. 522,425
6 Claims. (Cl. 242—55.12)

This invention relates generally to magnetic tape apparatus of the type having tape transport means together with a magnetic head for recording and/or playback operations.

Conventional magnetic tape apparatus makes use of turntables or like means for carrying the supply and take-up reels. A driving capstan engages the tape and feeds it from a supply reel to a magnetic recording and/or reproducing head. One type of apparatus may employ three motors, one connected to the driving capstan, and the other two coupled to the turntables. The motor for the supply turntable is energized during operation of the machine to supply a small amount of torque to resist unwinding rotation, and also is adapted to be energized to rotate the turntable for a rewind operation. The motor coupled to the take-up turntable is energized during normal operation to supply sufficient torque for winding the tape as it leaves the driving capstan. Also in some instances this motor may be energized to wind up the tape at an accelerated (i.e., fast forward) rate, when the tape is not engaged by the driving capstan. Both of the turntable motors are generally of special design to provide the characteristics desired, and their cost adds considerably to the overall cost of the equipment. In addition to the motors just described, mechanical braking means are provided for both turntables to prevent backlash or excessive slackness of the tape at the end of a re-wind or fast forward tape driving operation. Tape transport means as just described involve electrical and mechanical complications, which add considerable cost to the equipment, and cause servicing and maintenance difficulties.

It is an object of the present invention to provide magnetic tape transport means of a greatly simplified character, which will simplify the electrical connections and parts required.

Another object of the invention is to provide apparatus of the above character having novel means for driving the turntables, whereby relatively inexpensive motors are used.

Additional objects and features of the invention will appear from the following description in which the preferred embodiments have been set forth in detail in conjunction with the accompanying drawings.

Referring to the drawings.

Figure 1:
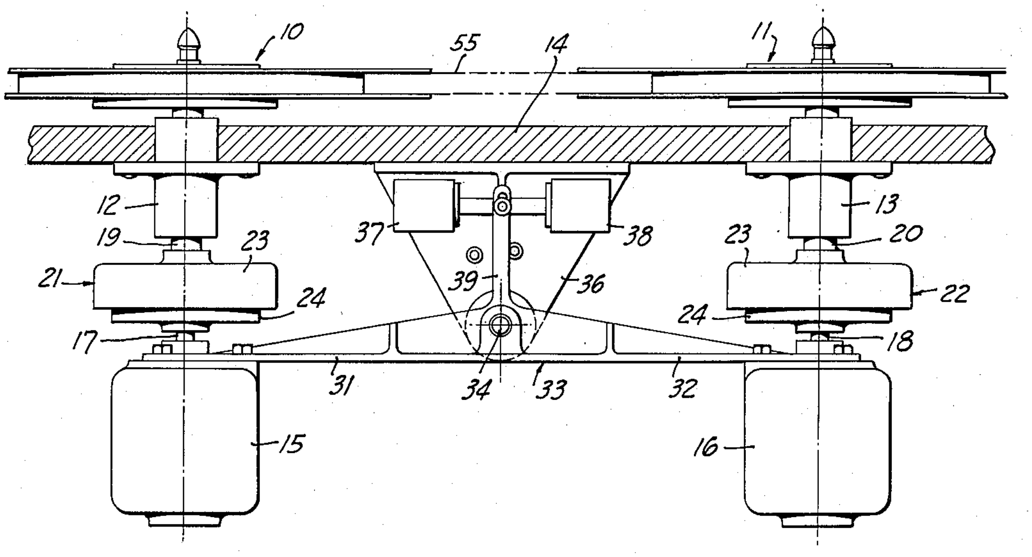
Figure 1 is a side elevational view illustrating magnetic tape transport means incorporating the present invention.

The tape transport means schematically illustrated in Figure 1 consists of the turntables 10 and 11 which are adapted to mount conventional supply and take-up tape reels. In accordance with conventional practice, that portion of the tape extending between the supply and take-up reels is arranged to move across a magnetic head (not shown) having recording and/or reproducing magnetic transducer units. Likewise, this portion of the tape is engaged by a driving capstan (not shown), driven by a separate motor (not shown), whereby the tape is fed past the magnetic head at a constant speed. An idler presses the tape into frictional engagement with the driving capstan, during normal reproducing operations, and is retracted to permit free movement of the tape, during re-wind operations. Journals 12 and 13 are provided to carry the turntab'es 10 and 11 on a plate or panel 14. Two electric motors 15 and 16 are provided, and may be of any suitable type, such as will operate without undue mechanical vibration or noise at a substantially constant speed. A conventional inexpensive alternating current motor of the induction type is satisfactory.

Figure 2:
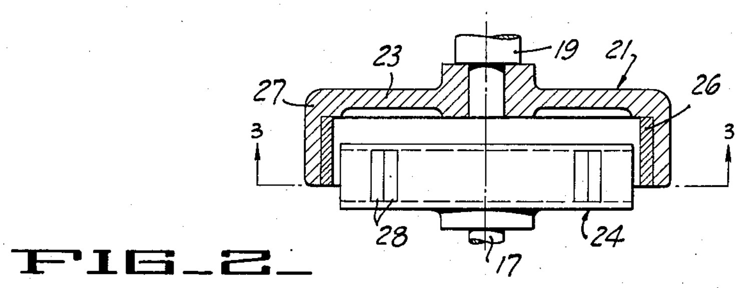
Figure 2 is a cross sectional view illustrating one of the drag coupling devices employed.
Figure 3:
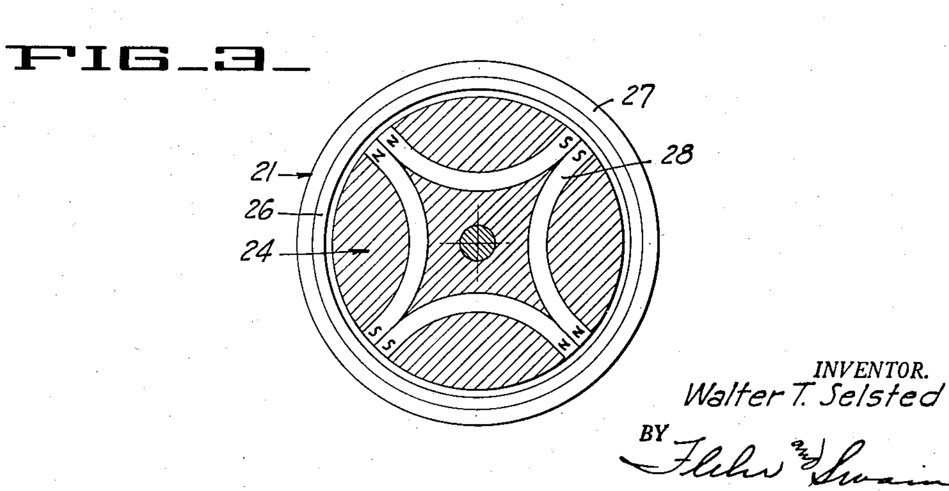
Figure 3 is a cross sectional view taken along the line 3—3 of Figure 2.

Shafts 17 and 18 of motors 15 and 16 are coupled to shafts 19 and 20 of turntables 10 and 11, by the magnetic drag coupling devices 21 and 22. These coupling devices can be formed as illustrated in Figures 2 and 3. Briefly, each coupling device can consist of two parts 23 and 24 which are rotatable with respect to each other. Part 23 is fixed to the shaft (e.g. shaft 19) of the associated turntable, while part 24 is fixed to the associated motor shaft (e.g. shaft 17). Part 23 can be in the form of a ring 26 formed of conductive metal, such as copper, and fixed within a shell or cup 27. Part 24 can consist of permanent magnets 28, suitably poled as illustrated, and imbedded in suitable material such as insulating resin. As is well-known in the operation of magnetic drag coupling devices making use of eddy currents, relative rotation between the parts 23 and 24 causes eddy currents to be induced in the conductive ring 26, with resulting application of a torque resisting relative rotation. The torque is a function of the relative speed of rotation between the parts 23 and 24, and the positioning of the part 24 within part 23. In other words, as part 24 is positioned farther within the ring 26 from the position shown in Figure 2, the magnetic drag effect on the torque is increased, and conversely, as part 24 is retracted, the torque is reduced.

In the embodiment of Figure 1, the electric motors 15 and 16, together with the parts 24 of the magnetic coupling devices 21 and 22, are supported by means permitting relative axial movement between the parts 23 and 24, and these movements are in opposite directions. Thus in Figure 1 the motors 15 and 16 are attached to arms 31 and 32 of a rocker 33. The rocker 33 has a pivotal connection 34 with a stationary supporting means 36.

Various means can be used for moving the rocker 33 to thereby oppositely vary the torque transmitted through the coupling devices 21 and 22. In some machines, manual means for this purpose may be employed. In other machines it may be desirable to provide suitable electrical control means whereby the rocker 33 can be positioned in a desired selected position. In Figure 1 the drawing, solenoids 37 and 38 are connected to an arm 39, which in turn is attached to the rocker 33. Selective energizing of these solenoids 37 and 38 serves to turn the rocker 33 to either one of two limiting positions. In one limiting position, coupling device 22 will have its element 24 located well within the part 23, thus providing for maximum torque for a given differential speed. At the same time, the part 24 for the other coupling device 21 will be retracted to provide for minimum torque. In the other limiting position, the parts for both coupling devices may, for example, be about half way retracted.

Operation of the apparatus described above is as follows: Tape reels are seated upon the turntables 10 and 11, and a tape threaded with respect to the guide means, the magnetic recording and/or reproducing head, and the driving capstan. The motors 15 and 16 are energized to operate at predetermined speeds, and in opposite directions. For a recording or playback operation, the driving capstan feeds the tape at a constant speed with respect to the magnetic head, and the rocker arm 33 is positioned whereby torque is transmitted through both the devices 21 and 22. The torque transmitted to turntable 10 through the device 21 is contra to the direction of unwinding rotation, and is sufficient to maintain proper tape tension. The torque transmitted to turntable 11 is in the same direction as the direction of rotation of this turntable to wind the tape upon the take-up reel. Release of the tape for this condition of the coupling devices results in fast forward tape speed. At the end of a recording or playback operation, the tape is released with respect to the driving capstan by retracting the associated idler, and at the same time the rocker 33 is rotated to its other limiting position to provide maximum torque transmission through device 21, and minimum through device 22. The torque thus transmitted to the turntable 10 is sufficient to wind the tape at a suitable speed, which at all times will be somewhat less than the speed of rotation of the motor 15. The small amount of torque transmitted by device 22 will serve to maintain some tape tension, during re-wind. At the end of the re-wind operation the motors 15 and 16 can be de-energized whereby the turntables and the tape come to rest. During the interval that turntable 11 is coming to rest, device 22 continues to apply drag or rotation resisting torque, and this serves to maintain tape tension and to prevent tape slack.

In some types of machines it is desirable to provide automatic re-wind when tape tension is relieved. Thus in Figure 4 there is shown a turntable 40 carried by a shaft 41. Two driving motors 42 and 43 are carried by suitable supporting means, and are arranged to transmit drive through magnetic coupling devices 44 and 45. Each of these devices consists of parts 47 and 48, corresponding to the parts 23 and 24 of Figures 2 and 3. However, the part 47 in each instance is carried by the associated arm of a rocker 49. Attachment to the rocker is by virtue of suitable journaling means 50, whereby the part 47 of each coupling device is free to rotate. A pulley 51 is attached to the shaft 41 and is engaged by driving belts 52 and 53. These belts engage the parts 47 of the coupling devices 44 and 45. As the rocker 49 is moved between limiting positions, it serves to vary the torque transmited by the devices 44 and 45 in opposite directions.

Figure 4:
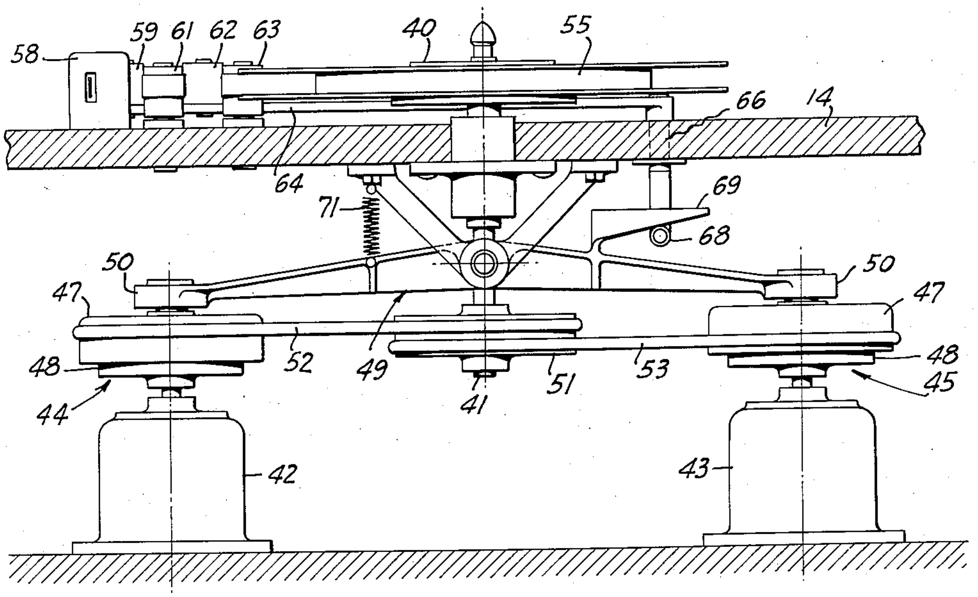
Figure 4 is a side elevational view schematically illustrating another embodiment of the invention, in which two electrical motors serve to drive one turntable in either direction.
Figure 5:
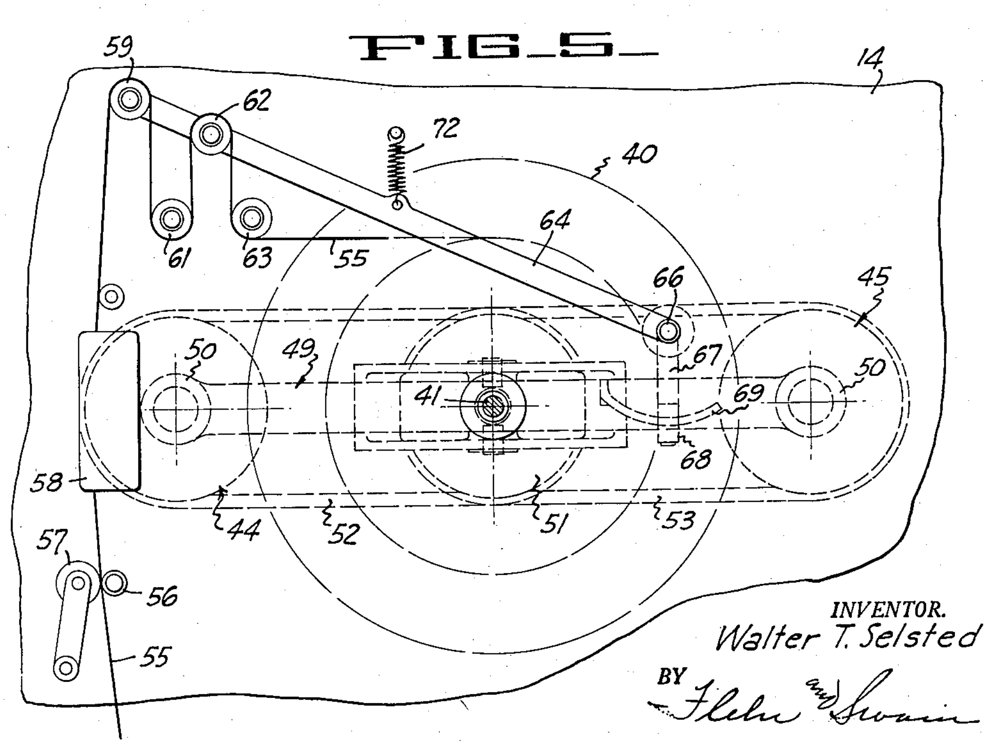
Figure 5 illustrates a tape tension arm and associated mechanism for controlling the driving of the turntable.

Various means can be employed for positioning the rocker 49 to secure a desired relationship between the torques transmitted by the motors 42 and 43. In the arrangement illustrated, means is engaged by the tape which serves to position the rocker 49 in accordance with tape tension. Thus, as shown in Figure 5, a tape 55 is engaged by driving capstan 56 and idler 57, is directed to a magnetic head 58 containing recording and/or playback transducer units, and is then looped over idlers 59, 61, 62 and 63. Idlers 59 and 62 are shown carried by a moveable tension arm 64, and idlers 61 and 63 are carried by a fixed support. From idler 63 the tape 55 extends to the reel mounted upon the turntable 41. One end of arm 64 is pivotally carried by a rotatable shaft 66. An arm 67 is attached to the shaft 66, and is provided with a roller 68 for engaging a cam 69. This cam 69 is attached to the rocker 49 and is shaped to provide the desired positioning for various angular positions of the arm 64. A tension spring 71, shown in Figure 4, is utilized for urging the rocker 49 in a direction to urge the cam 69 against the roller 68. Another spring 72 connects with the arm 64, and serves to apply tension to the tape 55 when the tape is being driven by the driving capstan 56.

The apparatus illustrated in Figures 4 and 5 operates as follows: Both motors 42 and 43 are energized to rotate in opposite directions at constant predetermined speeds. A predetermined tension maintained upon the tape 55 results in the positioning of the tension arm 64 intermediate its extreme positions. Movements of the arm 64 reflecting variations in tape tension, cause movements of the rocker 49, thus oppositely varying the torques transmitted through the coupling devices 44 and 45. In general, the variation in torques can be such that the resulting torque applied to the turntable 40 is proper to maintain the tape tension desired during unwinding of the tape. Assuming fairly fast unwinding speed, net torque can be in a direction to assist such rotation and thus prevent excessive tape tension. In the event the tape tension is relieved, as by retracting the idler 57, the arm 64 moves toward the right as viewed in Figure 5, and this movement is sufficient to increase the torque through the coupling device 44, and to reduce the coupling through the device 45. As a result, the motor 42 serves to drive the turntable 40 in the reverse direction and at an accelerated speed for a re-wind operation. It is evident therefore that the arrangement illustrated in Figures 4 and 5 provide for optimum tensioning, and at the same time makes possible automatic re-wind of the tape.

Figure 6:
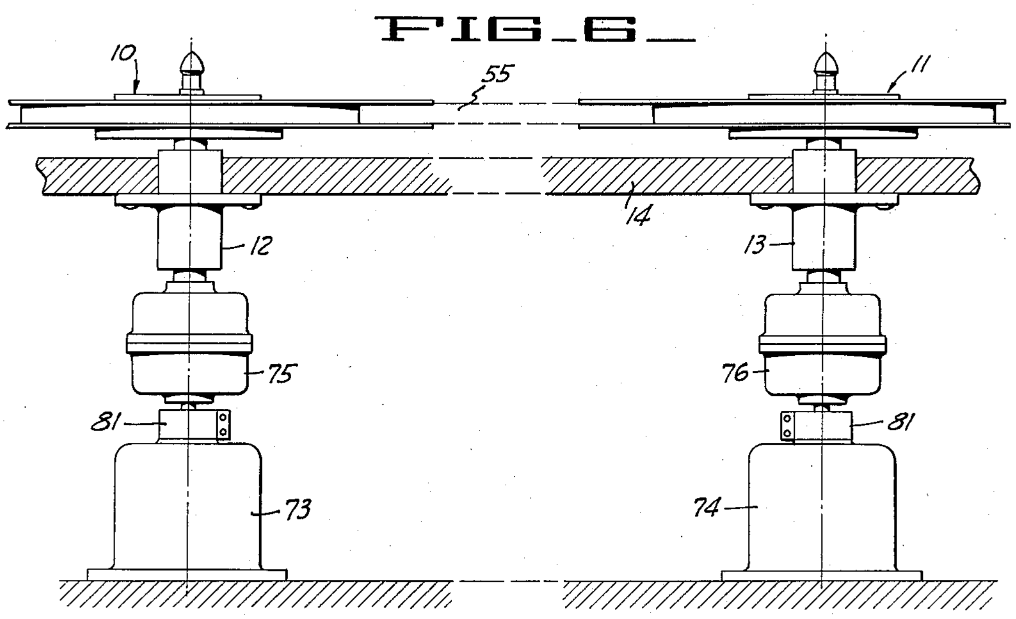
Figure 6 is a side elevational view illustrating another embodiment of the invention.
Figure 7:
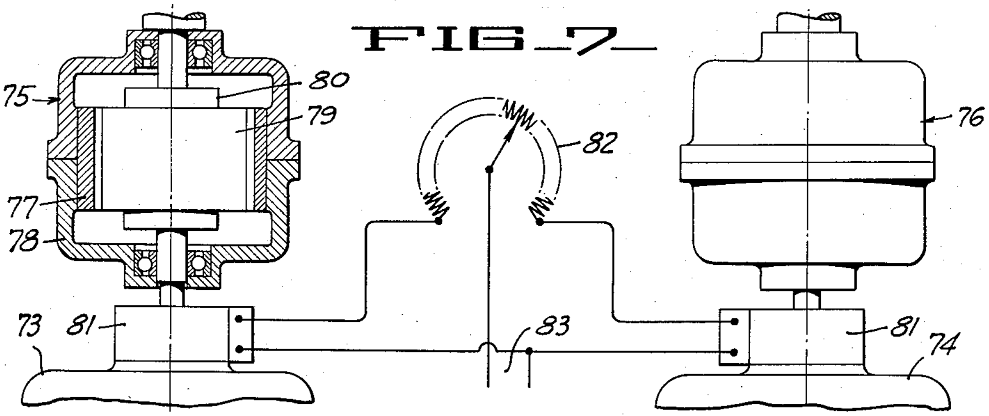
Figure 7 is a circuit diagram for the apparatus shown in Figure 6.

Figures 6 and 7 illustrate another embodiment of the invention in which the coupling devices are provided with windings adapted to be excited. In this instance the turntables 10 and 11 are coupled to motors 73 and 74, through magnetic coupling devices 75 and 76. As illustrated in Figure 7, each of the devices 75 and 76 can consist of a ring 77 of conductive material carried by an outer shell 78. An inner poled rotor 79 is formed of magnetic material and is provided with a winding 80. Terminal leads for the windings can be extended through the shaft to a slip ring assembly 81. The rotor 79 is shown being driven by the associated motor 73, 74 and the outer shell 78 is connected to the associated turntable 10, 11. Suitable circuit means connect with the windings whereby the excitation can be gradually increased or decreased, to transmit the desired torque. Thus the circuit in this instance includes a potentiometer 82, and a source of direct current 83. Movement of the potentiometer in one direction or the other serves to oppositely vary the excitation of the two coupling devices, and likewise to oppositely vary the torques developed.

Figure 8:
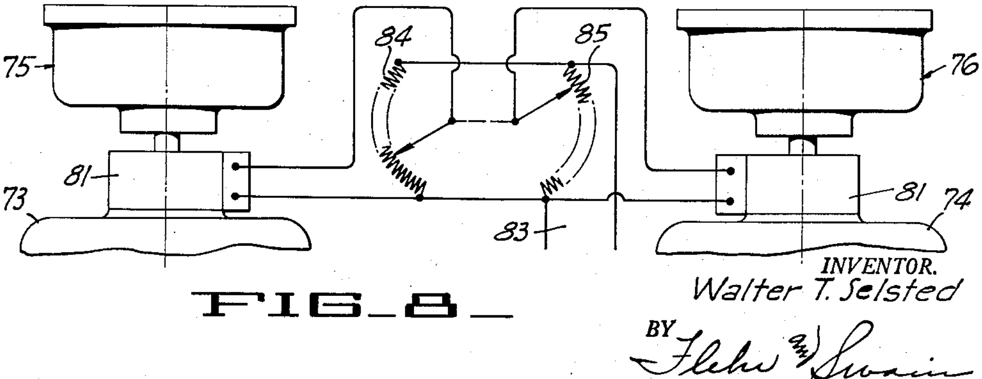
Figure 8 is a modified circuit diagram for the apparatus shown of Figure 6.

Figure 8 shows another circuit arrangement for the magnetic coupling devices 75 and 76 of Figure 6, involving the use of two potentiometers 84 and 85. These potentiometers can be mechanically interconnected as indicated, and serve to separately control the supply of current from the source 83 to each of the two coupling devices.

Figure 9:
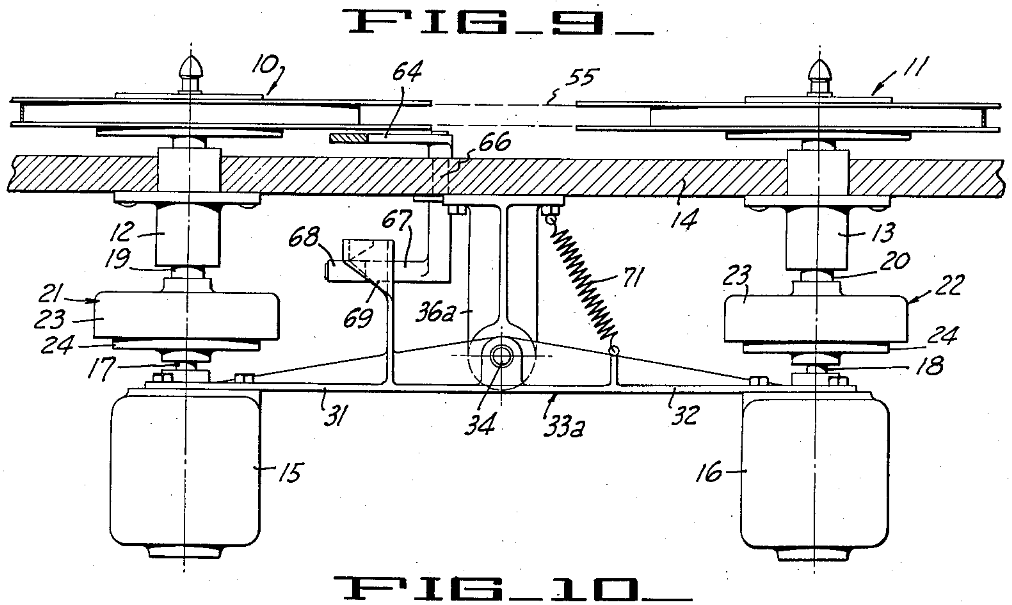
Figure 9 is a modification of the apparatus shown in Figure 1.
Figure 10:
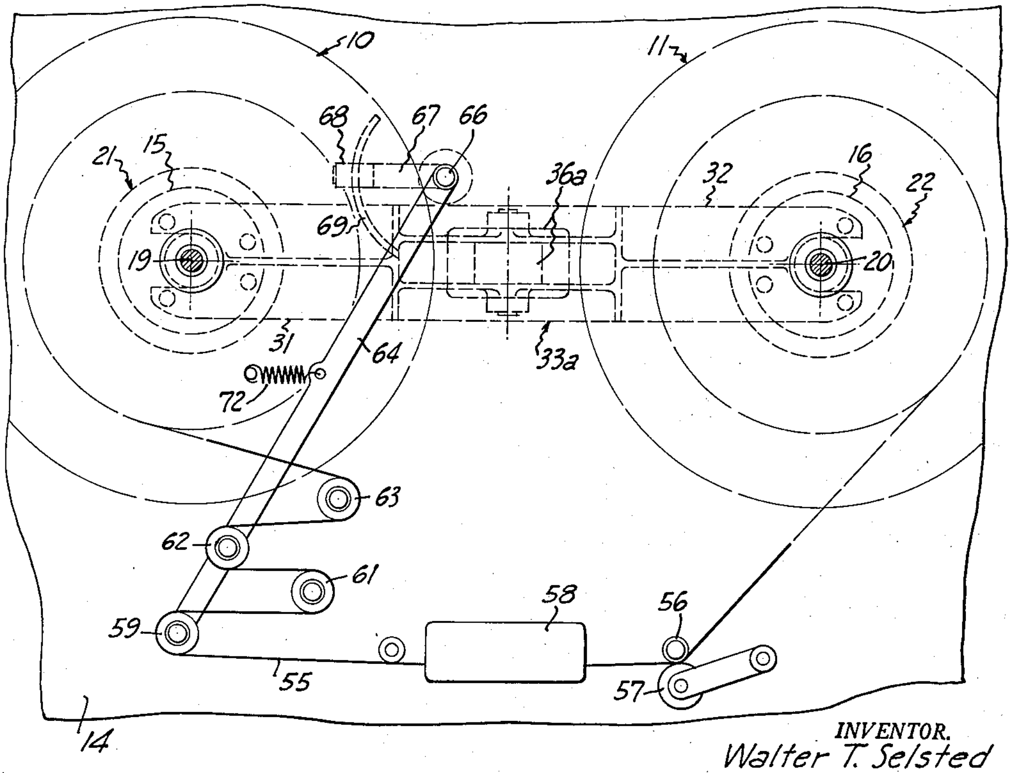
Figure 10 is a top plan view showing the machine illustrated in Figure 9.

Figures 9 and 10 show a machine of the type shown in Figure 1, but with a tape tension control of the type shown in Figure 5. Thus in this instance the tape tension arm 64 controls the positioning of cam roller 68, whereby cam 69 is positioned to position the rocker 33. With this arrangement the torques applied are varied gradually and oppositely to maintain a predetermined tension and to cause automatic re-wind when the tape is released.

There has been described herein a magnetic tape transport means which can be used with a variety of machines. The magnetic coupling devices can be made to apply the desired torque to the associated turntable, and the torques can be subject to change without tape slack or breakage. By application of the present invention it is possible to utilize relatively inexpensive electric motors for driving the turntables, as compared to the relatively expensive motors previously employed. The motors are isolated from the turntables through the magnetic coupling devices, thus minimizing undesirable application of vibration to the turntables and tape.

I claim:

1. In magnetic tape apparatus, two reel holding means for engaging and rotating supply and take-up reels, two electric driving motors, means for operatively coupling each motor to an associated reel holder, each of said means including a magnetic coupling device comprising two adjacent rotatable aligned parts, one having a permanent magnet and the other an annular conductive path, one of the parts of each device being movable relative to the other for varying the torque transmitted through the same, a rocker member, means forming a pivotal support for said rocker member, the two opposite extending arms of said rocker member being attached to the movable elements of said coupling devices, and means for moving said rocker member to thereby oppositely vary the torques transmitted from the electric motors to the reel holding means.

2. In magnetic tape apparatus, tape reeling means adapted to be engaged by a magnetic tape, electrical motor means, a pair of magnetic coupling devices of the drag type connected with the motor means and serving to transmit torques from the motor means to the reeling means, each coupling device comprising two adjacent aligned parts, one having a permanent magnet and the other an annular conductive path, one of the parts of each device being movable relative to the other part in the direction of their axes to vary the torque being transmitted, means forming a mechanical connection between the movable parts of the two coupling devices, said means comprising a pivotable rocker arm having each of its free ends connected to an associated movable coupling part, and means for moving said rocker arm to thereby oppositely vary the torques transmitted by the two coupling devices.

3. Apparatus as in claim 2 in which the tape reeling means comprises a pair of rotatable reel holding means, each such means having a driving connection with an associated coupling device.

4. Magnetic tape apparatus as in claim 2 in which separate electrical motors are connected to the two coupling devices.

5. In magnetic tape apparatus, a pair of rotatable reel holding means, each holding means being adapted to mount a tape reel, a pair of electrical motors, a pair of magnetic coupling devices of the drag type connected with the electric motors and serving to transmit torques from the motors to the corresponding reel holding means, each coupling device comprising two adjacent aligned parts, one having a permanent magnet and the other an annular conductive path, one of the parts of each device being movable relative to the other in the direction of their axes to vary the torque being transmitted, means forming a mechanical connection between the movable parts of the two coupling devices, said means comprising a pivoted rocker having each of its free ends connected to an associated movable coupling part, yieldable tape tensioning means engaging that portion of the tape extending between reels that are carried by the reel holding devices, said means including an element movable in accordance with variations in tape tension, and means acting in response to movements of said element to cause movements of said rocker arm to oppositely vary the torques transmitted by the two coupling devices.

6. Magnetic tape apparatus as in claim 5 in which the motors are mounted upon the free ends of the rocker arm.

References Cited in the file of this patent

UNITED STATES PATENTS

| | | |
|---|---|---|
| 1,862,267 | Honig | June 7, 1932 |
| 1,937,077 | West | Nov. 28, 1933 |
| 2,365,691 | Fodor | Dec. 26, 1944 |
| 2,467,507 | Stone | Apr. 19, 1949 |
| 2,469,706 | Winther | May 10, 1949 |
| 2,769,932 | Zozulin et al. | Nov. 6, 1956 |
| 2,855,160 | Fundingsland | Oct. 7, 1958 |

FOREIGN PATENTS

| | | |
|---|---|---|
| 704,798 | Great Britain | Mar. 3, 1954 |